(12) United States Patent
Estkowski et al.

(10) Patent No.: US 8,463,461 B2
(45) Date of Patent: Jun. 11, 2013

(54) TRAJECTORY PREDICTION BASED ON STATE TRANSITIONS AND LANTENCIES

(75) Inventors: Regina I. Estkowski, Bellevue, WA (US); Robert C. Wilson, Jr., Covington, WA (US); Ted D. Whitley, Lopez Island, WA (US)

(73) Assignee: The Boeing Company, Chicago, IL (US)

( * ) Notice: Subject to any disclaimer, the term of this patent is extended or adjusted under 35 U.S.C. 154(b) by 652 days.

(21) Appl. No.: 12/558,573

(22) Filed: Sep. 13, 2009

(65) Prior Publication Data

US 2010/0174475 A1 Jul. 8, 2010

Related U.S. Application Data

(63) Continuation-in-part of application No. 11/096,251, filed on Mar. 30, 2005, now abandoned.

(51) Int. Cl.
*G01C 23/00* (2006.01)

(52) U.S. Cl.
USPC .............................................. 701/3; 244/3.15

(58) Field of Classification Search
USPC ......... 701/1, 3, 23, 27, 41, 96, 213, 300–301; 244/3.11, 3.15; 340/932.2; 235/411–413
See application file for complete search history.

(56) References Cited

U.S. PATENT DOCUMENTS

| | | | |
|---|---|---|---|
| 7,212,917 B2 | 5/2007 | Wilson, Jr. | |
| 7,230,221 B2 * | 6/2007 | Busse et al. | 250/203.6 |
| 7,333,052 B2 * | 2/2008 | Maskell | 342/195 |
| 7,457,690 B2 | 11/2008 | Wilson, Jr. et al. | |
| 2008/0294749 A1 | 11/2008 | Derenge et al. | |
| 2009/0125221 A1 | 5/2009 | Estkowski et al. | |

OTHER PUBLICATIONS

Lim et al., :Maneuvering target tracking using jump processes, Proceedings of the 30th Conference on Decision and Control, pp. 2049-2054 (Dec. 1991).
Salmond et al., "Target tracking and guidance using particles," Proceedings of the American Control Conference, pp. 4387-4392 (Jun. 2001).
Allison Ryan, "Information-theoretic tracking control based on particle filter estimate," AIAA Guidance, Navigation and Control Conference (Aug. 2008).
Lymperopoulos et al., "Adaptive Aircraft Trajectory Prediction using Particle Filters," AIAA Guidance, Navigation and Control Conference (Aug. 2008).

* cited by examiner

*Primary Examiner* — Thomas Black
*Assistant Examiner* — Luke Huynh
(74) *Attorney, Agent, or Firm* — Hugh P. Gortler

(57) ABSTRACT

According to an embodiment herein, a method of predicting a trajectory of an aerospace vehicle comprises accessing an observation of a state of the vehicle from sensor data; and using a computing system to predict different possible future positions and attitudes of the vehicle, including using the sensor data and associated latencies to determine a set of vehicle state transitions. Each state transition in the set is computed as a function of estimated latency. The method further comprises using the computing system to update a prior distribution of the vehicle state with the state transitions. Consequently, the predicted trajectory is compensated for latency.

20 Claims, 7 Drawing Sheets

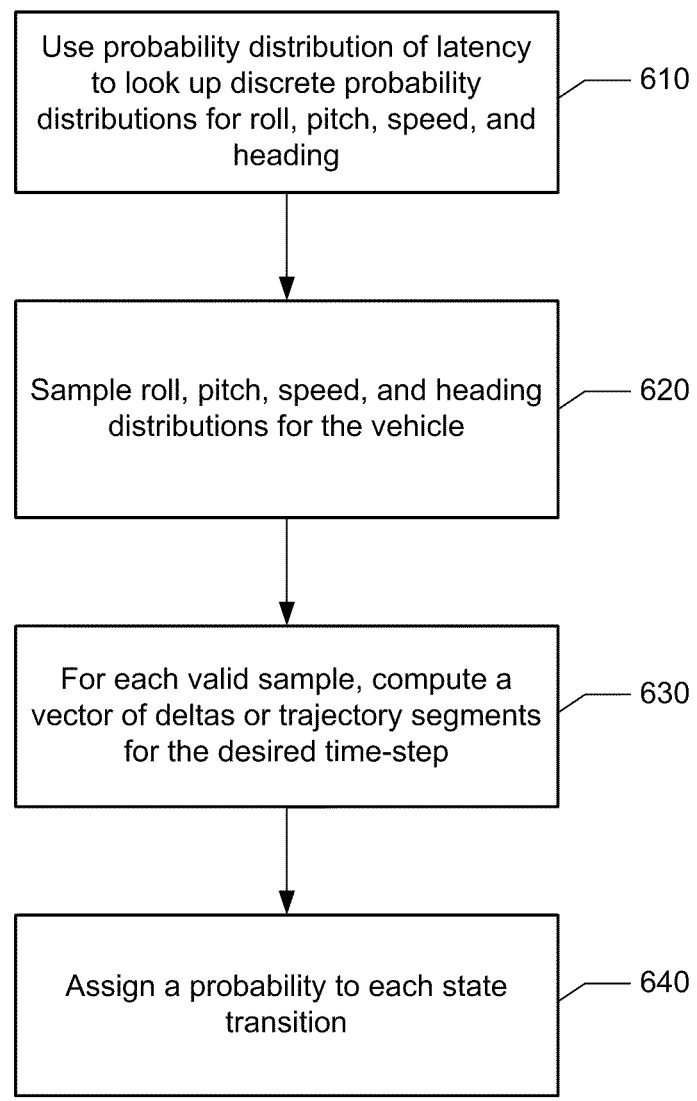

TRAJECTORY PREDICTION BASED ON STATE TRANSITIONS AND LANTENCIES

This is a continuation-in-part of copending U.S. Ser. No. 11/096,251 filed Mar. 30, 2005.

BACKGROUND

Military and civilian control of any designated airspace relies upon accurate projection of a vehicle's movement through the space. Radar systems and other tracking systems are used to determine the position of a vehicle in airspace. However, there is a time lag between the time the sensor measurement is made and the time the sensor data is received. Radar, for instance has a lag of several seconds. Consequently, the sensor data is "old" by the time it has been received. Thus, the tracking system data does not show the instantaneous position and attitude of a vehicle, only a past position and attitude.

Instantaneous positions and attitudes are predicted from the sensor data. The predicted positions and attitudes are used to control airspace.

Accurate predictions are important. Accurate predictions allow for denser traffic as well as significantly improved individual vehicle safety. If the movements of vehicles through airspace could be predicted with greater accuracy, multiple vehicles in airspace could be spaced tighter, allowing more vehicles in the space. Improved methods for more accurately tracking and projecting a trajectory of a vehicle through an air space are desirable.

Fast computational speed is also important. Computational speed can also contribute to overall latency. Therefore, it would also be desirable to improve computational speed of the predictions.

SUMMARY

According to an embodiment herein, a method of predicting a trajectory of an aerospace vehicle comprises accessing an observation of a state of the vehicle from sensor data; and using a computing system to predict different possible future positions and attitudes of the vehicle, including using the sensor data and associated latencies to determine a set of vehicle state transitions. Each state transition in the set is computed as a function of estimated latency. The method further comprises using the computing system to update a prior distribution of the vehicle state with the state transitions. Consequently, the predicted trajectory is compensated for latency.

According to another embodiment herein, a system for predicting movement of a vehicle in airspace comprises a computer programmed to receive multiple observations over multiple data links about vehicle states, including estimated latencies associated with the observations; and update a vehicle state particle distribution with a set of state transitions particles. Each state transition particle is a function of latency associated with the observations. The spread of the updated distribution reflects uncertainties due to the latencies of the data that is used in generating the distribution.

According to another embodiment herein, an article comprises computer memory encoded with data for causing a computer to predict different possible future positions and attitudes of an aerospace vehicle. The predicting includes using the sensor data and associated latencies to determine a set of vehicle state transitions, each state transition in the set computed as a function of estimated latency; and updating a prior distribution of the vehicle state with the state transitions.

BRIEF DESCRIPTION OF THE DRAWINGS

FIG. 6 is an illustration of a method of using precomputed values to determine state transitions.

DETAILED DESCRIPTION

Figure 4:
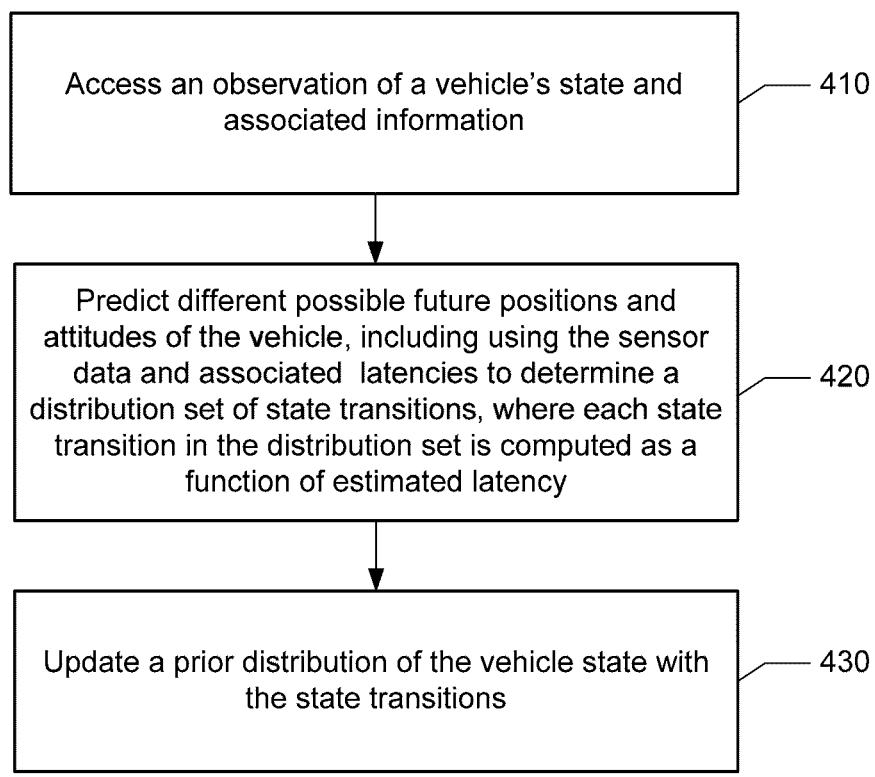
FIG. 4 is an illustration of a trajectory prediction method.

Reference is now made to FIG. 4, which illustrates a general method for predicting a trajectory of an aerospace vehicle. At block 410, an observation of the vehicle's state is accessed. For example, the vehicle state may include roll, speed, heading, pitch, latitude, longitude and altitude. An observation may be obtained from data sources via data links. Vehicle state may also be obtained from the vehicle's internal state (e.g. power settings, pitch commands, roll commands).

Data sources include GPS, inertial navigation units (INUs), air navigation systems, and radar. Data links include, but are not limited to, the Iridium satellite network, radio, 3G, Controller Pilot Data Link (CPDL), and Tactical Digital Information Links (TADIL). Typically, the sensor data will be accessed from different data links having different characteristics. For example a 3G link may have a lower link latency, lower dropout rate, etc.

The observation also includes additional information associated with the data sent over a data link. The associated information includes estimates of latency or information that allows latency and its probability to be estimated. Latency effects quality of information. Latency may include, but is not limited to, any one or more of the following:

a. data output latency, which refers to the time period that elapses from a sensor measurement to output of a data message describing the measurement. Sensor latency contributes to data output latency.

b. update rate latency, which refers to the time period that elapses between successive data message outputs that contain a record of an event occurrence.

c. link latency, which refers to the time period that elapses between the time that a data message is sent over a data link and the time that it is received by a system that predicts the trajectory.

d. computation latency, which refers to the time period that elapses between the time that a trajectory predictor receives a data message and the time that a trajectory prediction is generated by the predictor using that data message as an input.

At block 420, a computing system is used to predict different possible future positions and attitudes of the vehicle, including using the sensor data and associated latencies to determine a set of state transitions. Each state transition in the set is computed as a function of estimated latency.

At block 430, the computing system is used to update a prior distribution of the vehicle state with the state transitions. The updated distribution provides a prediction of the vehicle's trajectory. Consequently, the predicted trajectory is compensated for latency.

A state transition as used herein may refer to a probabilistic change in state that occurs between the time of a prediction using a latency-compensated observation and the time of the next prediction.

In some embodiments, a state transition may be a point prediction of change in vehicle state over a time step. In other embodiments, a state transition may result in a trajectory segment over a period of time. As an example, a trajectory segment may be described as a function of $[t_1, t_2]$, $\alpha_{lat}(t)$, $\alpha_{lon}(t)$, $\alpha_{alt}(t)$, where $\alpha_x(t)$ are parameterized curves over the time interval $[t_1, t_2]$. Use of point predictions and trajectory segments is described below.

The spread of a distribution is affected by latencies. The spread of the distribution reflects the uncertainties due to the latencies of the data that is used in generating the distribution. A distribution based on sensor data having a higher uncertainty has a greater spread than a distribution based on sensor data having a lower uncertainty.

The probability distribution for possible current and predicted state is not limited to any particular distribution. A Gaussian distribution is but one example. The probability distribution is not even limited to an analytical representation. Advantageously, probability distributions resulting from highly irregular or nonlinear behavior can be handled, such as is possible for rotorcraft and other highly maneuverable aerospace vehicles (e.g., small unmanned aerial vehicles and fighters).

Thus, the method of FIG. 4 compensates for latency in the data used to predict the trajectory of a vehicle. Latency compensation increases the accuracy of the prediction. It also provides a better estimate how precise the predictions are.

The inclusion of latency estimates and latency compensation is important for applications such as tracking multiple vehicles in airspace and deconflicting the airspace. Accurate predictions allow for denser traffic as well as significantly improved individual vehicle safety. By predicting the movements of vehicles through airspace with greater accuracy, multiple vehicles in airspace can be spaced tighter, allowing more vehicles in the airspace.

Without use of latency in estimating vehicle current and predicted state, a large uncertainty buffer surrounding vehicle track estimates may be required for safety reasons. Excessively large aircraft separation distances will result and lead to inefficient use of airspace.

Figure 5:
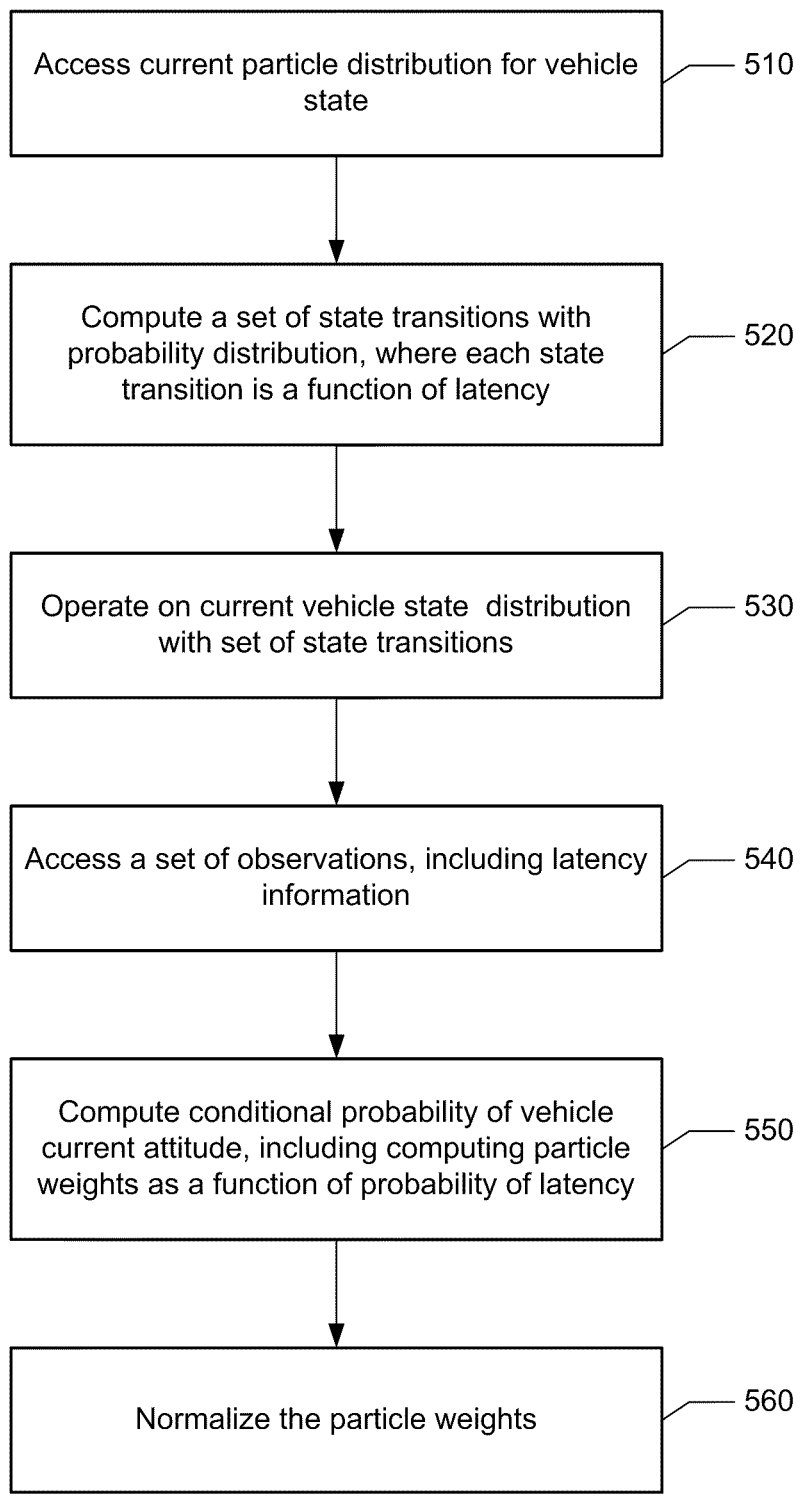
FIG. 5 is an illustration of a trajectory prediction method.

Reference is now made to FIG. 5, which illustrates an example of predicting future positions and attitudes of a vehicle. In general, a distribution of state transitions (i.e., a probabilistic state transition) is determined from the sensor data and probability of latency, and particle filtering is performed on the state transitions to obtain the distribution.

At block 510, the current posterior particle distribution for vehicle state is accessed. Let $P_N$ denote the posterior particle distribution at step N for vehicle state, where $P_N = \{p_i^N\}_{i=1,\ldots,k_N}$ and where each particle $p_i^N = (x_i^N, w_i^N)$, $i=1\ldots,k_N$ in the distribution is a function of a timed location with attitude information $(x_i^N)$ and a weight $(w_i^N)$. An example of a vehicle state is a timed location and attitude:

$$x_i^N = (\text{time},\text{latitude},\text{longitude},\text{altitude},\text{roll},\text{pitch},\text{speed},\text{heading}).$$

At block 520, a set of state transitions with probability distribution is computed. Let $ST_{N+1}$ denote a state transition distribution that operates on particle distribution $P_N$ to generate a prediction for step N+1 (the result is also a prior distribution for step N+1). Let $$ST_{N+1} = \{st_j^{N+1}\}_{j=1,\ldots,l_{N+1}}$$

where $st_j^{N+1}$ denotes a particle in the state transition set. Each state transition particle $st_j^{N+1} = (x_j^{N+1}, w_j^{N+1})$, $j=1,\ldots,l_{N+1}$ in $ST_j^{N+1}$ includes a vector of deltas for for the vehicle state $x_i^N$ and weight $w_i^N$. An example of a vector of deltas for timed location with attitude and behavior information is $$x_j^{N+1} = (\Delta\text{time},\Delta\text{latitude},\Delta\text{longitude},\Delta\text{altitude},\text{roll}_{ST},\text{pitch}_{ST},\text{speed}_{ST},\Delta\text{heading}_{ST})$$

where $\Delta$time is a time step that is the same for all state transition particles. As another example, deltas of roll, speed and pitch may be used.

The time step $\Delta$time of the state transition is a function of the latency. In some embodiments, the time step $\Delta$time is chosen to match the sum of estimated output latency and data link latency.

In other embodiments, the time step $\Delta$time is chosen to match the sum of output latency, data link latency and computation latency. This is advantageous where the vehicle predicted state is to be transmitted over a data link from the predictor to a recipient (e.g. an airspace controller or aircraft). The recipient will have an estimate for vehicle current state at the time the state information is used. Such prediction may be performed on-board a vehicle.

The vector of deltas may be computed by obtaining a current observation and using equations of motion or a vehicle-specific model to predict the change in vehicle state over the time step $\Delta$time. Each state transition is then assigned a probability as determined by a probability of latency. For example, an assigned probability may be computed as the product of the probabilities of data link latency and the prediction computation latency.

Thus, each state transition particle is a function of latency. Its deltas are a function of latency (since the time step is a function of latency), and its weights are also a function of latency (since the weights are determined from the probability of latency). In some embodiments, where multiple links are used, latency may be estimated for each link.

In some embodiments, a vector of trajectory segments may be used instead of a vector of deltas. An example of a vector of trajectory segments is $x_j^{N+1} = ([t_1, t_2], \alpha_{lat}(t), \alpha_{lon}(t), \alpha_{alt}(t))$, where $\alpha_x(t)$ are parameterized curves over the time interval $[t_1, t_2]$.

At block 530, the current vehicle state distribution is operated on with the state transition set to obtain a prior distribution $\overline{P}_{N+1}$. The state transition set $ST_{N+1}$ operates on the posterior particle distribution $P_N$ having particles $p_i^N = ((\text{time}, \text{position}, \text{attitude}), w_i^N)$, by $$p_i^N = ((\text{time},\text{position},\text{attitude}),w_i^N)$$

$\mapsto ((\text{time}+\Delta\text{time}, \text{position}+\Delta\text{position}, \text{attitude}_{ST}), \text{prob}(\text{attitude}_{ST}|\text{attitude})w_j^{N+1})$, where $\text{prob}(\text{attitude}_{ST}|\text{attitude})$ is obtained via look-up function call to access equations of motion or aircraft models.

At block 540, a set of observations for the vehicle is accessed. Let $O_{N+1} = \{O_n^{N+1}\}_{n=1,\ldots,m_{N+1}}$ denote the set of observations. Each observation $O^{N+1} = \{X^{N+1}, i\}$, in the set $O_{N+1}$ consists of state data $x_n^{N+1}$ and information associated with the state data. An example of the state data is $X_n^{N+1} = (\text{time}, \text{position}, \text{altitude})$. The associated information may include, but is not limited to, timing information, data link type and quality, latency information, and sensor reliability.

The observations could have various sources, including but not limited to GPS, INU (inertial navigation unit), the air navigation system, radar. Observations can be received over multiple data links and individual final observation variables could consist of one received observation, be the result of applying data fusion to multiple observations received from multiple sensor systems or over multiple data links, or include one or more observations selected from multiple received observations.

The associated information may be received along with the state data, may come from other sources, or may be determined by the system running the filtering.

At block 550, the conditional probability of vehicle current attitude is computed as determined by the state transition given the vehicle attitude associated with the particle operated on by the state transition. As part of this computation, preliminary particle weights are computed, resulting in an $N+1^{th}$ posterior particle distribution. For each particle $\bar{p}_{ij}^{N}$ in the prior distribution $\bar{P}_{N+1}$, a weight $\bar{w}_{ij}^{N}$, may be computed as follows.

$$\bar{w}_{ij}^{N} = \bar{w}_i^{N} * \bar{w}_j^{N} * \text{prob}(\text{attitude}_{ST}|\text{attitude}) * \text{prob}(X_j^{N+1} x_i^N | O)$$

where O is either a single observation or a fusion of multiple observations.

At block 560, particle weights are normalized. The sum total of the particle weights is 1.

The method of FIG. 5 can be adapted to compute predictions extremely quickly. The state transitions can be pre-computed and represented as a set of discrete entries, which can be stored in a database, lookup table or other storage means. The precomputed state transitions are accessed at run-time according to observations and data latencies and supplied to a particle filter. Pre-computing the state transitions reduces computation latency and increases accuracy of the predictions.

Computational speed can be further increased by reducing the number of particles in the particle filter. The fewer the number of particle, the coarser the representation. The greater the number of particles, the finer the representation.

The particles may be reduced by defining a partition of state space and merging the particles in each partition element by taking the mean of all particles to define particle state and summing all particle weights to define a particle weight. An example of a state space partition is a grid where each grid element is a "cube" with dimensions of 1 degree latitude, 1 degree longitude, and 500 ft. altitude. Let e denote a state space partition element and $\{v_i\}_i$ denote the state space variables. Define a particle, p(e) in e by $p(e)=(v(e), w(e))$, where $v(e)=v_1(e), \ldots, v_k(e))$ with $v_i(e)=\text{mean}\{v_i(p):p\in e\}$ and $$w(e) = \sum_{p \in e} w(p).$$

Set the prior distribution $$\bar{P}_{N+1} = \bigcup_e p(e).$$

Increasing computational speed is highly advantageous. Higher speeds increase timeliness of predictions and reduce uncertainty in output. If computational speed is too slow, a prediction may be too old to use by the time it is outputted.

Other steps may be performed. For example, the computing system can optionally select the best data to use from observations received over multiple data links from one or more sources or to perform data fusion on multiple observations. In addition suspect data may be flagged error in the data may be estimated. Data correlation may be used to determine what data to use and to determine whether data is valid. In addition, a comparison of data characteristics and estimated errors may be made across data received from multiple vehicles in a region in order to determine what data is most consistent between vehicles so that data used is selected for optimizing vehicle relative position estimates.

Reference is made to FIG. 6, which illustrates a method of using pre-computed values to determine state transitions. At block 610, a probability distribution of latency is used to look up discrete probability distributions for roll, pitch, speed, and heading.

At block 620, roll, pitch, speed, and heading distributions for the vehicle are sampled.

At block 630, for each valid sample, a vector of deltas or trajectory segments for the desired time-step is computed At block 640, each state transition is assigned a probability as determined by (probability of latency)*(probability of sample point), where the input probabilities are obtained by look up or by function returns using the sample point and link type as inputs.

State transitions are not limited to analytical mappings or linear differential equations. In some embodiments, in a particle filter, a state transition could be specified by a jump/diffusion process, a look-up of known behavior given current indicators, or a stochastic differential equation.

Figure 7:
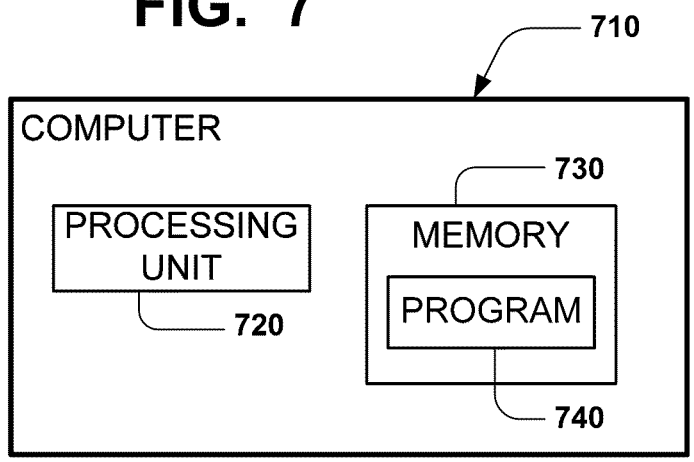
FIG. 7 is an illustration of a computer for performing trajectory prediction.

Reference is now made to FIG. 7, which illustrates a computer 710 for predicting trajectories of one or more vehicles. The computer 710 includes a processing unit 720 and a computer-readable medium, such as memory 730. The memory 730 stores a program 740 that, when executed, causes the computer 710 to access observations of one or more vehicles and predict trajectories for those vehicles as described herein.

A method herein is not limited to any particular application. One example is tracking of an aerospace vehicle.

Figure 8:
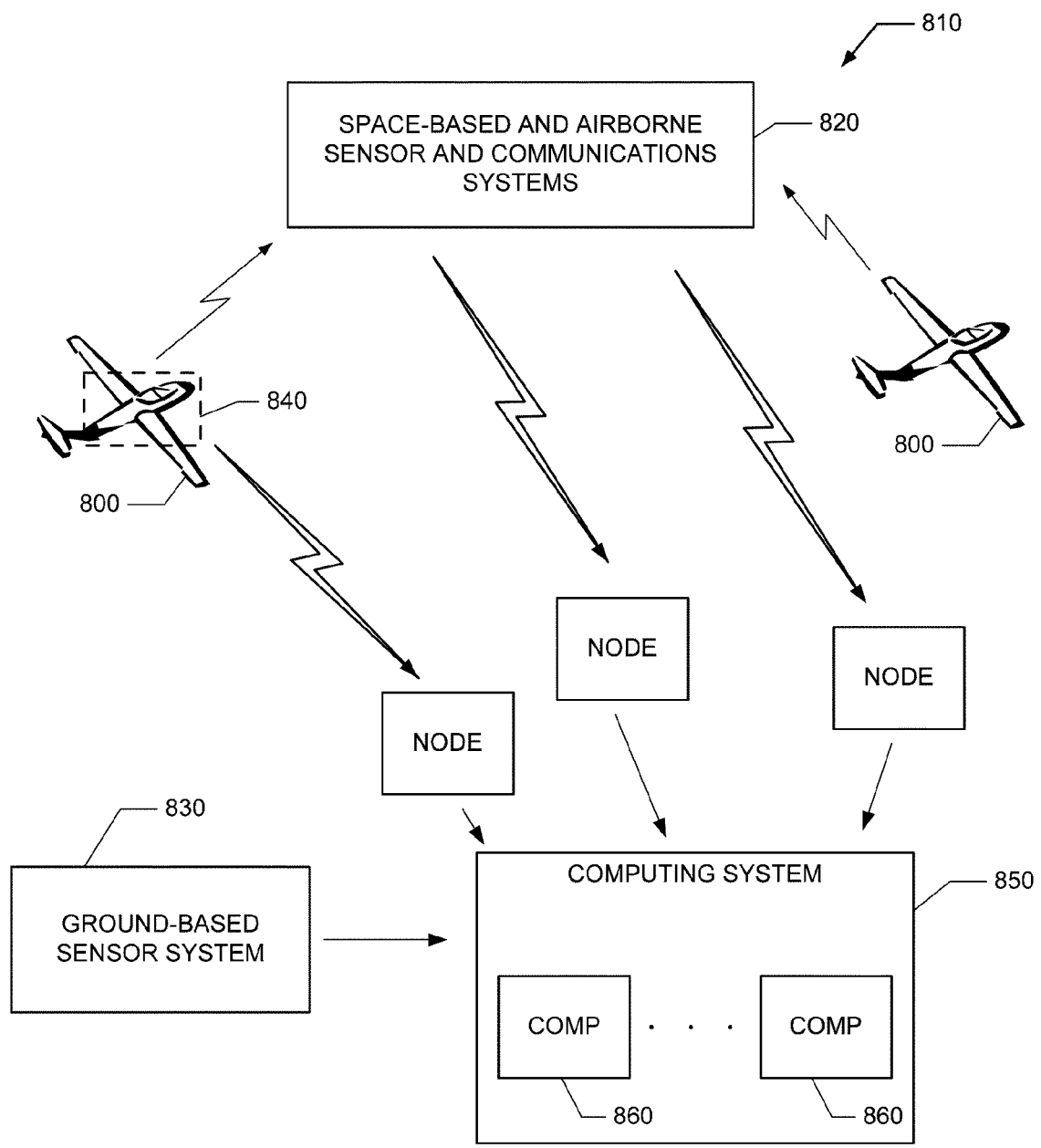
FIG. 8 is an illustration of a trajectory prediction system.

Reference is made to FIG. 8, which illustrates a tracking system 810 for aerospace vehicles 800 in an airspace. The aerospace vehicles 800 communicate with space-based and airborne sensor and communications (e.g., communications satellites) systems 820. The aerospace vehicles 800 may also communicate with ground-based observation systems 830. These sensor and communications systems 820 and observation systems 830, as well as sensors 840 onboard the vehicles 800, communicate with a computing system 850, which includes one or more computers 860. The computing system 850 predicts trajectories of the vehicles 800 and tracks the vehicles 800. The computing system 850 may use a method herein. For instance, the computing system 850 may use the following method.

Figure 1:
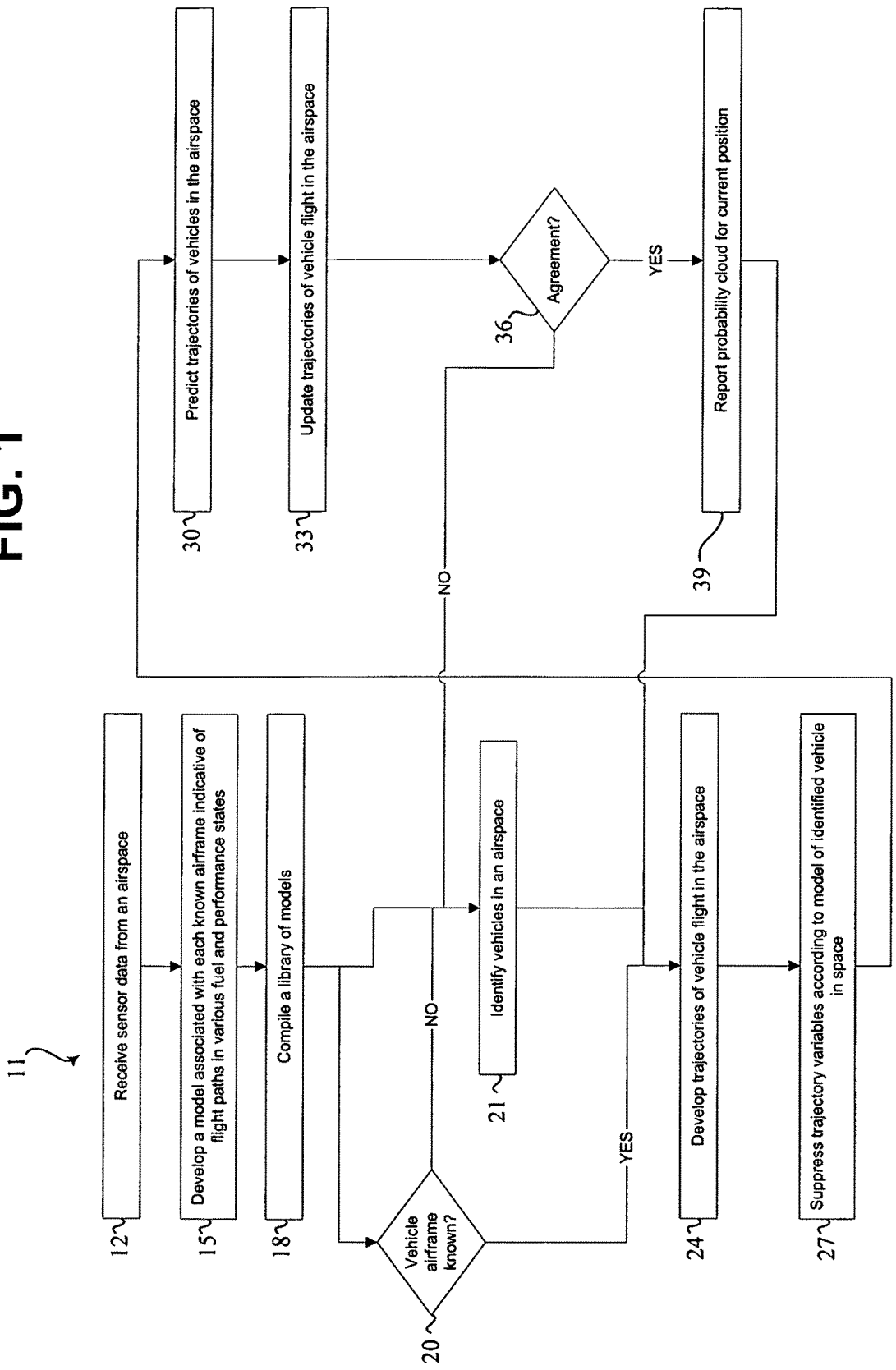
FIG. 1 is an illustration of a method of predicting a vehicle trajectory.

Referring to FIG. 1, a method 11 includes receipt of sensor information from sensors detecting a vehicle presence in the airspace at a block 12. Such sensors may include, for example, not only such radars as might exist in the airspace for tracking normally collocated with a controlling facility, but also such distinct radars as may exist in the space, including those normally used for sensing weather or remote radars.

In some embodiments, radar returns may be treated differently than is normally the case with most tracking systems. Generally, with radar returns, where there is more than one return from a vehicle, the comparison is a simple "go-no go" by comparing the returns to each other and deciding if there is sufficient agreement between the returns to accept the location the returns present as sufficiently accurate. Some embodiments, however, may treat neither of the radar returns as absolute indications, but inherently harmonizes the radar returns as discrete inputs to the particle-filtering model. An example of inherently harmonizing the radar returns includes obtaining a particle distribution, $\bar{P}_{N+1}{}^n$ for each observation, $o_n^{N+1}$ by setting observation specific preliminary weights $$\bar{w}_{ij}^{N+1} = w_i^N W_j^{N+1} \text{prob}(\text{attitude}_{ST}|\text{attitude})\text{prob}(X_j^{N+1}(x_i^N)|o_n^{N+1})c_n^{N+1},$$

where $c_n^{N+1}$ is a weighting factor dependent on the relative "value" of the observation as determined using the auxiliary info and $$\sum_n c_n^{N+1} = 1;$$

and setting $$\overline{P}_{N+1} = \bigcup_n \overline{P}_{N+1}^n$$

to obtain a prior distribution, $\overline{P}_{N+1}$ with preliminary weights. As such, the model is independent of which of the several sensor types is used to locate the vehicle in the airspace but, rather, sets and then adjusts the confidence of each of the positions, in order to derive a location of high confidence.

Additionally, on board devices for navigation may also communicate with a network, such as by means of a radio link with the vehicle in the airspace. These devices are useful in placement and may augment the information discerned from the radars. The onboard devices might include onboard sensor systems such as GPS and Loran navigation, including the use of dead reckoning to decrease latency between fixes from onboard navigation sensors.

One embodiment herein would allow locating and tracking aircraft in an airspace based solely upon each aircraft's communication with a central processing unit. To enable the onboard systems to input into the system perceived navigation fixes, the system is configured to communicate by mean of transmission and reception of information. Each aircraft is placed in the airspace based upon the aircraft's own perception of its position in the airspace and, optionally, upon perception of the aircraft by instruments on other aircraft in the airspace, such as satellites over-flying the airplane.

To suitably enable the communication between the central processing unit and the aircraft, transmissions between the aircraft and the central processing unit, data are transmitted words setting forth the data in uniformly formatted fields. Use of uniform fields facilitates rapid input of the onboard perceptions of onboard instrumentation. The embodiment exploits flight management system-derived data constructed to include uniform fields to communicate onboard instrument perception of flight management system variables to include a timestamp and identification code to suitably identify the aircraft and the time of the navigational fix. The navigational fix optionally includes such flight management system data such as latitude, longitude, true heading relative to the ground, and ground speed. To determine a predicted position, additional information allows the particle filter to better pick out probabilities. The flight management data may optionally include altitude, pitch, roll, and yaw. If altitude, pitch, roll and yaw are not included, they may be estimated.

As information is received from the several sensors in the airspace and such onboard sensors from which information is received, backward study of an aircraft's movement through the airspace is possible by cataloging the data according to the timestamps that accompany the data. The data roughly indicate the movement of the aircraft through the airspace. The better the movement of the aircraft can be known as the aircraft traverses the airspace, the better probabilities for the aircraft's movement from a point in the airspace to a second point in the airspace. The goal of the backward study is to derive characteristics of an aircraft as it moves through the airspace. Collectively, the characteristics are referred to as a "performance envelope" or a "performance model."

At a block 15, in an optional model development stage, models are developed for known airframes. The models may include purely recorded statistics, and themselves contain no equations or formulas, as do polynomial models or they may make use of standard system identification techniques and equations describing vehicle behavior. The models may be built up using raw and processed data. Because the data received from the aircraft is identified as associated with a particular aircraft or family of aircraft, generalizations can be derived from the behavior of the aircraft within the airspace.

The data received from sensors in the airspace and onboard the aircraft may be used in modeling. In particle filtering methods, the conditional probabilities and formulas for particle filtering are represented directly in the statistical models as discretized probability distributions. The model distributions are sampled in order to determine the importance weights and obtain predicted and updated particle distributions. In some embodiments, the models continue to be refined in light of additional information added in Bayesian iteration. The data received from the known aircraft is used to refine the filter and assure that optimal results result from the filter's use.

Particle filtering is a class of methods for filtering and smoothing in non-linear or non-Gaussian state space models. Particle filters are powerful sampling-based inference or learning algorithms for dynamic Bayesian networks. For instance, in a very simple single-dimensioned example, a vehicle passing along a line transits along the line a number of times under study. If the behavior of the vehicle is such that it travels at speeds between certain rates, finding a probability of a particular displacement from a first point over a period can be readily reckoned based upon the experiences of the filter.

One possible drawback of applying a particle filter for tracking vehicles in an airspace is that sampling in high-dimensional spaces can be inefficient. In some embodiments, however, the model has "tractable substructure," which can be analytically marginalized out, conditional on certain other nodes being imputed. The advantage of this strategy is that it can drastically reduce the size of the space to be sampled.

One advantage of marginalizing out some of the variables is that it can drastically reduce the size of the sampling space. Preliminary filtering has proven very useful to marginalize out variables, the remaining issue is the judicious selection of which variables to filter out. Part of the modeling includes deciding which variables to marginalize based upon the identity of the aircraft being tracked.

In order to develop models, the data collected from aircraft transits through the airspace is analyzed in order to establish a "behavior" to associate with the aircraft. The models typically include accumulations of tracks and corresponding variables such as airframe, power state, and payload that together form at least some (and possibly all) of the relevant observables relating to a vehicle's passage through the airspace. The statistical model is then used to form mathematical models. Variable states for such as power and fuel state, attitude, altitude, and heading are associated with the models as well as other suitable variables.

With continued reference to FIG. 1, in some embodiments, the initial mathematical models (block 15) are suitably developed including posterior probabilities at spaces in accord with the Markov chain representing the prior movement of the vehicle through the space. At a block 18, a library of vehicle models is compiled. The library of models is useful to identify vehicles traveling through the airspace. For each distinct track, a distinct filtering is necessary according to the aircraft being studied. Each aircraft will evoke a corresponding set of variables to minimize in order to get an optimal tracking solution. From this point, the method 11 shifts from passive observation to optionally build models corresponding with distinct aircraft to active prediction of tracks within the airspace.

At a block 20, whether a tracked vehicle in the airspace is known determines the next step. Where a vehicle is not known, after conventional methods of interrogation, e.g. transponder squawk, radio interrogation, the vehicle is identified based upon comparison between a vehicle's trajectory through the airspace as sensed by the sensors monitoring the space with the entries in the library of models. At a block 21, the probabilities that populate each model are suitably used to identify the vehicle by any of a family of vehicles such as military fighter aircraft, or in better situations, a particular type of airframe such as an F/A 18, or in the very best situation, a particular airframe where discernable differences in performance or location are "known" to the model. By "known," a level of statistical confidence sufficient to rule out other models is meant.

At a block 24, the trajectories of the vehicles moving in the airspace are developed from the generated models. These trajectories are only generated if there is a plan and that plan contains a sparse set of waypoints. These waypoints provide information on various flight parameters, including, for example, latitude, longitude, altitude, and speed. In generating trajectories, the differences (between adjacent elements) for the data field values of interest are first found. The actual values are determined by summing over the differences, rather than directly. To economically develop the models for trajectory generation, the preferred embodiment exploits information relating observed differences to change over a longer period. This change is used as an approximation to actual local slope. The trajectories will be compared with the particle filter predictions to determine if the vehicle is behaving or if there is an out-of-bounds condition.

Based upon the identity of the aircraft as derived at either of block 20 or 21, the set of variables to be marginalized are selected, thereby allowing the suitable selection of variables for rapid discernment of a predicted flight path (block 27). The identities of the variables suitable for marginalization have been stored in association with the aircraft at the block 15 to form the model and are recalled at this time to aid in the solution of the particle filtration.

Once flight trajectory characteristics of the vehicle in the airspace are known, the trajectories of the vehicles in the airspace may be suitably predicted by means of the model at a block 30. Additionally, flight characteristics of an aircraft may be programmed into an avionics package on board for transmission of the model to a processing facility to either augment or to replace the model in the library. A predicted trajectory may be thought of as a cloud in the airspace wherein the confidence that a vehicle is at each arbitrary point within the airspace exceeds a definable threshold. The cloud is defined by spatial dimensions and a time dimension such that at any one time there is a bubble that itself moves through the airspace. Given that the boundaries of each cloud are edges of likely locations of a vehicle in the airspace, the clouds can suitably pack the airspace to allow safe transit by the vehicle through the airspace.

At a block 33, in one embodiment, an updated track of the aircraft based upon additional data received from sensors at the block 12 is superimposed over the cloud representing probable positions of the aircraft. The predicted cloud representing the track of the aircraft, in most instances will suitably envelop the updated track.

At a block 36, the updated track is compared with the predicted cloud to check for the condition of enveloping the track. If the track is suitably enveloped, the prediction cloud and the track are judged to be in agreement. In the event of disagreement, the method returns to the block 21, to again identify the vehicle based upon the track information. Where there is agreement, the method moves on to the block 39 reporting a latest track prediction. The report of the prediction having issued, the process returns to the block 24.

Returning to the block 24, the trajectories of the vehicles are further developed to reflect the movement of the clouds to a "next" position, further developing the trajectories of the vehicle through the space. The blocks 24 through 39 are repeated to continually track the vehicles through the space and to further refine the probability clouds of the track.

Figure 2:
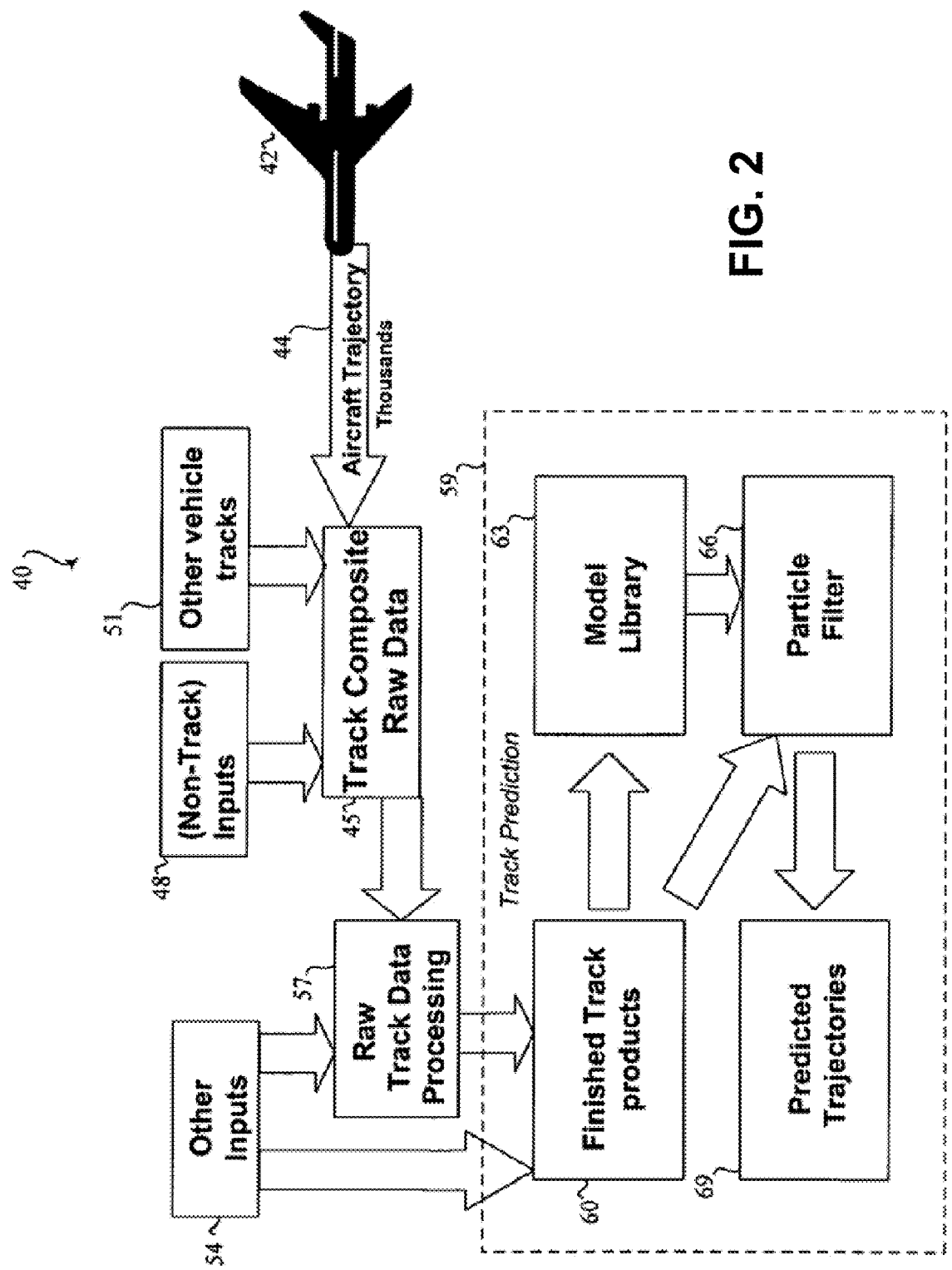
FIG. 2 is an illustration of a system for controlling aircraft in a controlled airspace.

Referring to FIG. 2, a system 40 for predicting a track of an aircraft 42, through an airspace derives routes, in part, on trajectory data 44 transmitted by the aircraft 42 from its onboard avionics. Trajectory data 44 includes such information as a GPS navigational fix indicative of a position and altitude. Optional additional data includes attitude, power state, aircraft type, laden weight, fuel load and other operational data. The trajectory data is selected to well-define the performance and location state of the aircraft as it operates in the airspace, and to allow prediction of the aircraft's current course through the airspace. Trajectory data may also include some portion of a flight plan associated with the aircraft.

Trajectory data is not limited to GPS navigational information. Any of radio altimetry information, Loran fixation information, terrain-based fixation information, or any other suitable information may suitably augment the trajectory information 44 to provide more complete agreement on the navigational position, speed, heading, and altitude on the aircraft 42. All suitable on board navigational fixation means can be used for determining the position of the aircraft 42 in the airspace.

On board the aircraft 42, a data word is formulated to describe the instantaneous trajectory data 44 along with a time stamp that uniquely identifies the time the trajectory data 44 is captured. Additionally, an identifier is assigned to the aircraft 42. In some embodiments, the unique identifier is "hardwired" or permanently assigned to the aircraft 42. Alternatively, a temporary identifier is assigned as a part of a "handshake" transaction, such as when the data word is transmitted by radio to a Track Composite Raw Data Center 45. By either means, or by a hybrid process of identification, the Track Composite Raw Data Center 45 begins a track assigned to the aircraft 42.

The Track Composite Raw Data Center 45 compiles trajectory information 44 from the aircraft 42 in question, as well as trajectory information or tracks 51 from the numerous other aircraft 42 that may occupy the airspace. Additionally, non-track information 48 such as weather and terrain information augments a "big picture" view of the airspace to fully define all of the various hazards that the aircraft 42 must avoid as it transits the airspace.

Notably, the Track Composite Raw Data Center 45 is not necessarily a distinct location geographically from other assets in the system. Rather, it is a node for collecting the "big picture" information that may not, itself have all of its elements co-located at a single place in space. At some point, the trajectory data 44 from the aircraft 42 is joined with the other entire trajectory data garnered from other aircraft in the airspace and united with the weather and terrain data to give the anticipated construction of the "big picture" of the whole of the occupied airspace. As used here, man-made objects, and in the military case, threat objects such as surface-to-air missile sites, are treated as either having trajectories based upon, for example, radar tracks (as in the case of airborne objects), or alternately, as terrain data being themselves navigational limitations on the air space.

The trajectory information 44 received at the Track Composite Raw Data Center 45, and possibly augmented by at least one of weather and terrain information, is then compared to radar returns and other information held at various databases on the ground. For instance, raw tracking data 57 is the output of one or several ground tracking radar stations that give a returns based second "big picture" view of the airspace. Like the aircraft-centric views generated by compiling the trajectory data 44, the return data 57 is time stamped to give it temporal meaning when compared to the trajectory data 44.

The trajectory data 44 received from the Track Composite Raw Data Center 45 may be "hardened up" with the ground-based data 57 from the various radar tracks to ascribe to each trajectory data 44 a certainty of position. Hardening up in this context is to use more inputs for the particle filter to produce the probability clouds relating to each of the vehicles in the airspace. Thus, instead of a single point in space, each vehicle is represented in the trajectory data 44 as a cloud that within an accepted probability contains the aircraft 42. In most operational instances, the accuracy of the onboard trajectory data 44 will agree with the radar raw tracking data 57, thereby allowing very tight packing of trajectory vehicle location probability clouds.

Where there is a significant deviation in the data, ground resources can be tasked with more specific inquiry to provide better input to the particle filter. For instance, a backup radar in estimated proximity to the aircraft 42 can be directed to give a better resolution of the track of a particular aircraft. With this type of priority based redundancy, fewer radar assets are dedicated to the task of resolving each position in space. Rather, the backup radars only take on the hard cases as indicated by less workable trajectory data 44 agreement with track ground data 57. Once suitable resolution of all of the trajectory data for all of the aircraft 42 in the space is derived, the "live action big picture" of the airspace is suitably formulated.

Additionally, more data 54 are added to, the "live action big picture" to give a fully workable model of the airspace. Databases in computers on the ground may be used to augment the picture with additional information, just as weather return and terrain data were possibly added to it at the Track Composite Raw Data Center 45, to give the "live action big picture" all of the data necessary to describe the occupation of the airspace. For instance, the performance characteristics of each of the aircraft 42 in the airspace may be added to the trajectory data 44 for each of the aircraft 42 to suitably predict the ability of the aircraft 42 to maneuver in the airspace. Among the several ground-based data, the models stored in association with known airframes are used to further define the trajectory probability clouds in the airspace.

Recalling that the fuel state, aircraft attitude and power states, and other relevant performance data, as well as desired destination or mission data from the aircraft, were already included in the trajectory data 44 before it left the aircraft 42, the "live action big picture" includes trajectory data 44 that can be realistically used to predict probability and desirability of any aircraft 42 to reach a second location in the airspace from its current (or first) location. With such probabilities for each of the aircraft 42 within the airspace, efficient and coordinated control of the aircraft is possible.

To demonstrate the utility of knowledge of the performance and maneuvering characteristics of a particular airframe in packing an airspace, consider as an analogy the formation flying of such flight demonstration squadrons as the "Blue Angels" in the F/A-18 Hornet aircraft. Because the performance characteristics are suitably matched between the nearly identical airframes, and because of the knowledge that each of the pilots possess of the anticipated movements of each of the airframes relative to each other, the pilots are able to pack the airspace such that wingtip to wingtip separations of fewer than 36 inches are possible, thereby achieving an airspace packing efficiency that approaches the upper limit in the airspace.

Not all of the aircraft 42 in the airspace will be able or willing to make the complete disclosure of operation information comparable to trajectory data 44 received from commercial aircraft 42 on flights through the airspace. For instance, light general aviation aircraft will not have suitable avionics to transmit all of the trajectory data that would be ideal for control in the airspace. Additionally, military aircraft on missions may not be suitably able to disclose the trajectory data 44 without compromise to the security of the mission. In such instances, the Raw Track Data Processor 57 and radar tracks 51 are used to define the trajectory data 44 in the airspace. In operation, there will be a continuum of completeness of trajectory data 44 and the Raw Track Data Processor 57 will be suitably employed to augment the data to pass off a suitably precise and accurate "live action big picture" to a Track Predictor 59.

The Track Predictor 59 is assigned to each defined airspace. Airspaces may, for example, be configured to tile a defined space (e.g. the surface of the earth or some subset). For each defined airspace, the Track Predictor 59 will operate under a protocol of supervised autonomy coordinated so that there are no mid-air disasters at the boundaries of the airspace, and autonomous in that the controlling authority will route all aircraft within the airspace.

The Raw Track Data Processor 57 is configured to receive, compile, and display the "live action big picture" in the form of finished track products for Track Predictor 59. At the Track Predictor 59, the model of the trajectory is first compiled into the finished prediction at a Finished Track Compiler 60 that isolates each of the variables for processing as distinct instances for processing with the particle filter. The Finished Track Compiler 60 pulls out the identity information and suitably recalls from a Model Library 63 the flight management variables relevant according to the models stored in the Model Library 63 and the appropriate model is forwarded to a Particle Filter Processor 66 for processing finished track products from the Finished Track Compiler 60 in order to generate a predicted trajectory to a Predicted Trajectory Output 69.

The finished track or "live big picture" is both dynamic and Markov. To make the computation tractable, particle filters assume the dynamic system is Markov—that is, the current state variable $x_t$ contains relevant information. The previous state variables, $x_T$, T<t need not be explicitly considered. For locating objects, the Markov assumption implies that sensor measurements depend only on an object's current state and that in that particle filters probabilistically estimate a dynamic system's state from noisy observations. The location state could be a simple 2D position or a complex vector including 3D position, pitch, roll, yaw, and linear and rotational velocities. Particle filters represent the state at time t by random variables $x_t$. At each point in time, a probability distribution over $x_t$, called belief $Bel(x_t)$, represents the uncertainty. Particle filters aim to sequentially estimate such beliefs over the state space conditioned on all information contained in the sensor data.

Figure 3:
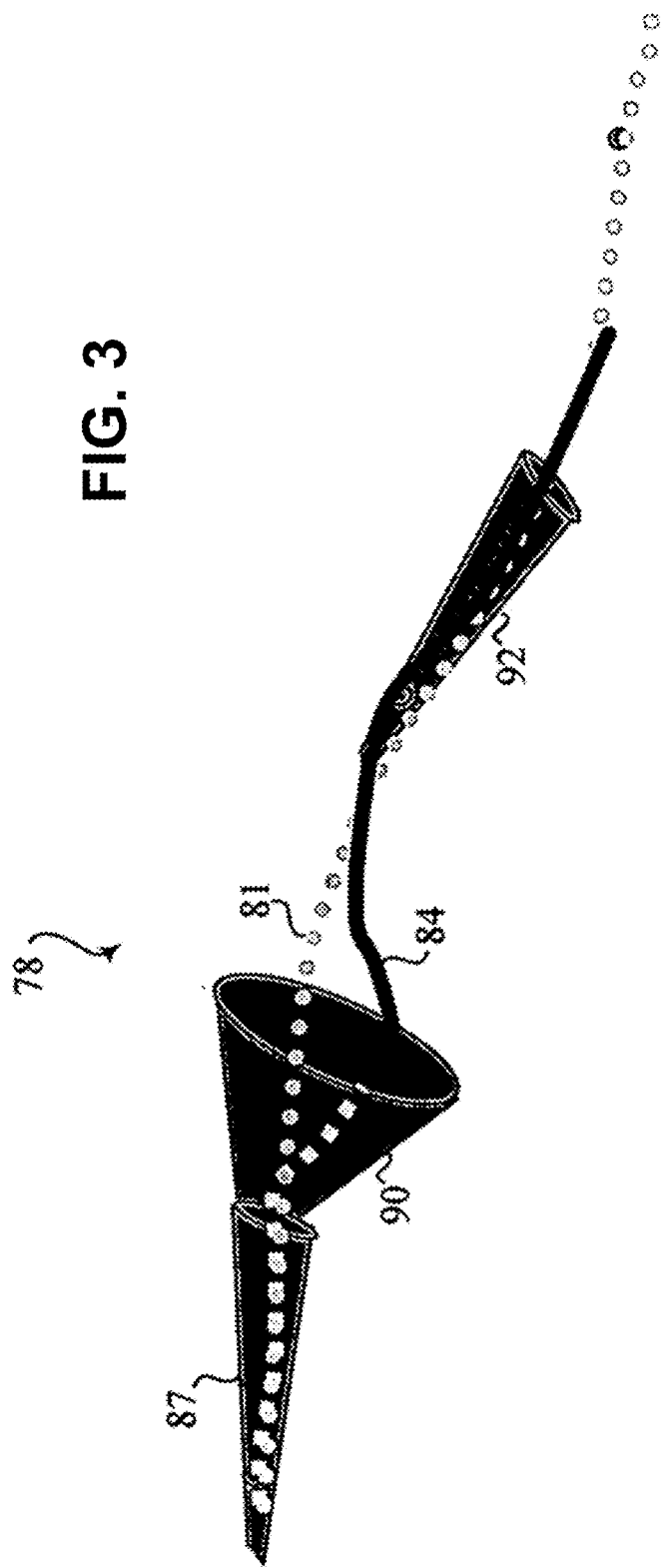
FIG. 3 is an illustration of a series of probability clouds forming a trajectory.

Referring to FIG. 3, a vehicle trajectory probability cloud over time 78 wherein a series of a first predicted track cloud 87, a second predicted track cloud 90, and a later track cloud 92 are shown in an illustrative conic section. In fact, probability clouds containing all positions of a specific probability or higher tend to look more like teardrops with their tails positioned at the last know point and having axes aligned generally in the direct of aircraft movement. Conic sections are illustrated to convey the overlapping relation of the first predicted track cloud 87, a second predicted track cloud 90, and a later track cloud 92. Conic sections are selected to represent the example of fixed-wing aircraft but are not suggested to limit the invention to such situation where the derived clouds are generally conic in part. The first predicted track cloud 87, a second predicted track cloud 90, and a later track cloud 92 are shown to include a curve in space, a predicted track 81, is generally configured to include center points of the first predicted track cloud 87, a second predicted track cloud 90, and a later track cloud 92.

For purposes of comparison, an actual position track 84 a curve selected to include the actual positions of the aircraft that is represented by the first predicted track cloud 87, a second predicted track cloud 90, and a later track cloud 92. At a position $x_{t-1}$, first predicted track cloud 87 (truncated at a leading edge here to allow a clearer illustration of the relationships of subsequent clouds) envelops the actual position track 84 based upon the location data at the position $x_{t-1}$. The actual position track 84 of the vehicle through the airspace deviates from the predicted track 81. The trajectory data collected at the position $x_t$, is subjected to the particle filter to yield a Bel($x_t$) the second predicted track cloud 90. The further deviation of the actual path 84 from the projected path 81 falls within the probability cloud 90 and therefore the comparison shows agreement. The method continually generates probability clouds such as the later prediction cloud 92.

The invention claimed is:

1. A method of predicting a trajectory of an aerospace vehicle, the method comprising:
   accessing an observation of a state of the vehicle from sensor data;
   using a computing system to predict different possible future positions and attitudes of the vehicle, including using the sensor data and associated latencies to determine a set of vehicle state transitions, each state transition in the set computed as a function of estimated latency; and
   using the computing system to update a prior distribution of the vehicle state with the state transitions;
   whereby the predicted trajectory is compensated for latency.

2. The method of claim 1, wherein a particle filter is used to predict the possible future positions and attitudes of the vehicle; and wherein each state transition particle is a function of latency.

3. The method of claim 2, wherein each state transition particle is a function of a vehicle state delta and a weight; wherein the delta occurs over a period matching the latency, and wherein each weight is based on a probability of latency.

4. The method of claim 1, wherein accessing the observations includes accessing the sensor data from multiple data links having different latency characteristics.

5. The method of claim 4, wherein latencies and uncertainties associated with each data link are estimated and used to determine the state transitions.

6. The method of claim 1, wherein predicting the future positions and attitudes includes determining a set of state transitions from the sensor data and latency probabilities, and performing particle filtering on the distribution to determine weights for the state transitions (particles) in the distribution.

7. The method of claim 6, wherein a plurality of number of state transitions are pre-computed and accessed at run-time according to observed indicators and data latencies; and wherein the pre-computed state transitions are used to obtain the distribution.

8. The method of claim 7, wherein at least some variables to the particle filter are marginalized.

9. The method of claim 1, wherein using the computing system includes:
   accessing a current ($N^{th}$) posterior particle distribution for a vehicle state;
   computing a set of state transition particles with probability distribution, where each state transition particle is a function of estimated latency;
   operating on the current vehicle state distribution with the state transition set to obtain a prior distribution; and
   computing particle weights to obtain an $N+1^{th}$ posterior particle distribution.

10. The method of claim 9, wherein the state transitions use a time step that is a function of latency, and wherein particle weights are a function of a probability of latency.

11. The method of claim 10, wherein the time step of the state transitions is chosen to match at least a sum of a link latency and output latency.

12. The method of claim 10, wherein the set of particles in the current posterior distribution is reduced in order to increase computational speed.

13. A system for predicting movement of a vehicle in airspace, comprising a computer programmed to:
   receive multiple observations over multiple data links about vehicle states, including estimated latencies associated with the observations; and
   update a vehicle state particle distribution with a set of state transition particles, each state transition particle being a function of latency associated with the observations, where the spread of the updated distribution reflects uncertainties due to the latencies of the data that is used in generating the distribution.

14. The system of claim 13, wherein a particle filter is used to update the vehicle state and wherein each state transition particle is a function of latency.

15. The system of claim 14, wherein each state transition particle is a function of a vehicle state delta and a weight; wherein the delta occurs over a period matching the latency, and wherein each weight is based on a probability of latency.

16. The system of claim 13, wherein updating the vehicle distribution includes:
   accessing a current ($N^{th}$) posterior particle distribution for a vehicle state;
   computing a set of state transition particles with probability distribution, where each state transition particle is a function of estimated latency;
   operating on the current vehicle state distribution with the state transition set to obtain a prior distribution; and
   computing particle weights to obtain an $N+1^{th}$ posterior particle distribution.

17. An article comprising computer memory encoded with data for causing a computer system to predict different possible future positions and attitudes of an aerospace vehicle, including using the sensor data and associated latencies to determine a set of vehicle state transitions, each state transition in the set computed as a function of estimated latency; and updating a prior distribution of the vehicle state with the state transitions, whereby the predicted trajectory is compensated for latency.

18. The article of claim 17, wherein a particle filter is used to predict the possible future positions and attitudes of the vehicle; and wherein each state transition particle is a function of latency.

19. The article of claim 18, wherein each state transition particle is a function of a vehicle state delta and a weight; wherein the delta occurs over a period matching the latency, and wherein each weight is based on a probability of latency.

20. The article of claim 17, wherein updating the vehicle distribution includes:
   accessing a current ($N^{th}$) posterior particle distribution for a vehicle state;
   computing a set of state transition particles with probability distribution, where each state transition particle is a function of estimated latency;
   operating on the current vehicle state distribution with the state transition set to obtain a prior distribution; and
   computing particle weights to obtain an $N+1^{th}$ posterior particle distribution.

* * * * *